(12) United States Patent
Turner (10) Patent No.: US 8,324,531 B2
(45) Date of Patent: Dec. 4, 2012

(54) POSITIONING MEANS AND METHOD OF USE THEREOF

(76) Inventor: Andrew Turner, Heighington (GB)

( * ) Notice: Subject to any disclaimer, the term of this patent is extended or adjusted under 35 U.S.C. 154(b) by 566 days.

(21) Appl. No.: 12/596,913

(22) PCT Filed: Apr. 28, 2008

(86) PCT No.: PCT/EP2008/003426
§ 371 (c)(1), (2), (4) Date: Oct. 21, 2009

(87) PCT Pub. No.: WO2008/131949
PCT Pub. Date: Nov. 6, 2008

(65) Prior Publication Data
US 2010/0140240 A1    Jun. 10, 2010

(30) Foreign Application Priority Data

Apr. 26, 2007 (GB) .................................. 0708013.8
Feb. 20, 2008 (GB) .................................. 0803070.2

(51) Int. Cl.
*B23K 9/00* (2006.01)

(52) U.S. Cl. ....................................................... 219/136

(58) Field of Classification Search .................... 219/136
See application file for complete search history.

(56) References Cited

U.S. PATENT DOCUMENTS

| | | | |
|---|---|---|---|
| 4,078,869 A | 3/1978 | Honeycutt | |
| 4,528,507 A * | 7/1985 | Domin et al. | 324/229 |
| 6,352,354 B1 * | 3/2002 | Boillot et al. | 362/253 |
| 6,365,867 B1 * | 4/2002 | Hooper | 219/121.45 |
| 2003/0058637 A1 | 3/2003 | Hsien | |
| 2004/0136795 A1 | 7/2004 | Chen | |
| 2004/0136796 A1 | 7/2004 | Chen | |
| 2008/0169277 A1 * | 7/2008 | Achtner et al. | 219/136 |

FOREIGN PATENT DOCUMENTS

| | | |
|---|---|---|
| DE | 19754857 | 7/1998 |
| DE | 102004011575 | 9/2005 |
| JP | 62003279 | 1/1987 |
| JP | 10296669 | 11/1998 |
| JP | 2002254367 | 9/2002 |
| JP | 2003311456 | 11/2003 |
| WO | 2008088643 | 7/2008 |

OTHER PUBLICATIONS

International Search Report and Opinion for International Application No. PCT/EP2008/003426, dated Aug. 7, 2008.

* cited by examiner

*Primary Examiner* — Huan Hoang
*Assistant Examiner* — Min Huang
(74) *Attorney, Agent, or Firm* — Warner Norcross & Judd LLP (57) ABSTRACT

A positioning device (13) for producing a light signal (32) to position a robot tool (2) relative to a workpiece (14) is provided. The positioning device (13) comprises a frame (16) and a pair of light sources (22, 24) mounted at the free end of the frame and arranged to direct a pair of light beams (28, 30) therefrom in converging directions which intersect with each other and provide a light signal (32) at a predetermined distance from the free end of the frame (16). The positioning device (13) can include two pairs of light sources to generate two pairs of intersecting light beams (28, 30; 29, 31, ). The two pairs of light sources can be arranged so that the two pairs of light beams (28, 30; 29, 31) are located substantially 90 degrees apart.

22 Claims, 8 Drawing Sheets

POSITIONING MEANS AND METHOD OF USE THEREOF

This invention relates to positioning means and a method of use thereof.

Although the following description refers almost exclusively to positioning means for use in positioning a robotic weld torch relative to a weld seam or workpiece, it will be appreciated by persons skilled in the art that the positioning means of the present invention can be used to position any object, part or surface relative to a further object, part or surface in use, such as in Mig, Mag, Tig and/or plasma cutting and/or the like.

Robotic weld torches are used in a number of different industries to allow precise automated welding of at least two objects, parts or surfaces together. A typical robotic weld torch includes an arm member having a first end which attaches onto the end of a robotic unit and a second free end. A channel runs through the arm member and an elongated electrode wire is located in the channel. An end of the electrode wire protrudes a short distance from the second free end of the arm member and a wire feed system feeds wire through the arm member as the wire is consumed during the welding process. A power source provides electrical current to the electrode wire during use. Air or liquid cooling means can be provided with the torch to cool the welding apparatus. A further inert gas can be dispensed adjacent the second free end to act as a shield around the weld site to prevent the same from contamination when the weld pool is in a molten state. A removable shroud can be located around the second free end adjacent the gas dispensing nozzle to ensure the gas is focused onto the weld location. The welding torch can be used as part of a fully automated or semi-automated welding system.

In order to join weld parts together, the individual parts must be precisely aligned and held securely in place during the welding process. In addition, the robotic weld torch needs to be aligned precisely with the parts being welded to provide an accurate weld. Conventionally, programming of the robotic weld torch by an operator to undertake a welding process involves the operator remotely moving the robotic torch along a preferred path of welding. Once programmed, the welding torch then follows the welding path set by the operator. If an incorrect weld path is set by the operator, this can result in problems associated with the weld bead, the weld throat, weld penetration, weld position and/or the like, which could result in separation of the weld material. It is therefore essential that the operator is able to accurately position the weld torch on the welding path.

However, a problem associated with welding is that it is often difficult for the operator to see the free end of the weld torch due to poor light conditions, obstructions and/or the like, thereby resulting in misalignment of the weld torch relative to a preferred welding path and poor weld quality. The operator has to be trained and have a high level of skill to precisely locate the weld torch on a correct welding path. As such, the positioning of the weld torch in terms of distance and angle of the torch relative to the workpiece is often susceptible to human error and requires expensive training to be undertaken by the operator. In addition, the electrode wire protruding from the free end of the arm member often gets bent during programming of the weld torch on the weld path. As such, the operator has to frequently trim the electrode wire to obtain the correct protrusion length. This is both time consuming for the operator and adds expense to the weld process. In addition, the operator may not realise the wire is bent and thus programme the weld path for a bent wire rather than the straight wire that will be fed through the second free end during welding, thus creating an incorrect weld path programme and poor weld quality.

It is therefore an object of the present invention to provide positioning means which increases the ease and reduces the skill level required by an operator to accurately position apparatus associated with the positioning means. It is also an object of the present invention to provide improved weld quality.

It is a further object of the present invention to provide positioning means for use on a robotic weld torch.

It is a yet further object of the present invention to provide a method of using positioning means.

According to a first aspect of the present invention there is provided positioning means for positioning a first object, surface or part relative to at least a second object, surface or part in use and wherein the positioning means includes lighting means capable of generating at least first and second light beams or light projections in use, the lighting means being arranged such that the light beams or light projections are directed away from the positioning means in a converging direction and said light beams or light projections intersect or substantially overlap with each other at a pre-determined distance from said positioning means.

Although the term "lighting means" is used herein, this term also covers use of an energy source or sources which are capable of emitting electromagnetic radiation of pre-determined wavelength and which can be visualised directly or indirectly with the human eye, such as radiation with a wavelength in the visible part or optical part of the spectrum (i.e. approximately between 380-750 nm wavelength). For example, a laser beam is often considered to be emitted from an energy source and the projected light is seen as a dot or small shaped projection on a surface on which the beam is projected in use.

The pre-determined distance where the light beams intersect typically corresponds to a correct or operative position of the positioning means from the first and/or second object, surface or part. When the positioning means is used on a robotic welding torch the correct or operative position at which point the light beams intersect typically corresponds to a weld seam between first and second weld parts.

Lens means or other focusing means can be used to direct and/or focus the light beams or light projections in a converging direction. The lens means of focusing means can be provided on the positioning means or associated therewith. However, in a preferred embodiment lighting means, such as for example a laser beam, are used which emit or project light of a substantially well-defined, narrow wavelength to produce substantially parallel beams of light from a single light source. In this embodiment lens means and/or other focusing means may not be required. This is typically in contrast to an incandescent light source which emits light over a wider spectrum of wavelengths to provide diverging light beams and lens and/or other focusing means are required to converge the light into a required direction.

Alternatively and/or in addition, the lighting means can be provided a one or more pre-determined spaced distances apart and/or at one or more pre-determined angles relative to each other to create the converging beams. For example, if laser beams or laser projections are used the light sources can be set at a pre-determined angle to allow the light beams or projections to converge towards each other to allow intersection of the beams or projections at some pre-defined distance.

If the light beams intersect a distance before they hit a surface of an object, part and/or the like, the beams will diverge away from each other and will be projected onto said object, part and/or the like a spaced distance apart. As such, when two beams are projected onto a workpiece, surface, object and/or part, a spaced distance between the beams indicates that the positioning means is too close to the workpiece for the beams to have yet intersected and the point of intersection will be a distance behind the workpiece, surface, object and/or part; or the positioning means is too far from the workpiece and the beams have intersected a spaced distance in front of the workpiece and the beams are now diverging after intersection.

At the point of intersection, the light beams substantially overlap, thereby forming a single light beam which can be easily seen by a user or detected by other suitable means, thereby informing the user or other suitable means that a pre-determined distance of separation (i.e. position) of the lighting means from the first and/or second object, surface or part has been achieved. Alternatively, if different coloured light beams are used, a further colour will be achieved at the point of intersection as a result of mixing of the different coloured light beams.

Preferably the lighting means includes at least two separate or different light sources to generate the at least first and second light beams. The light sources can be located at the same angle or different angles relative to the housing or frame of the positioning means. For example, two pairs of light sources could be provided to generate two pairs of light beams. The angle and/or distance of separation of the light sources for one pair could be different to the other pair, thereby allowing creating different light beam intersection points.

In one embodiment a part of light beams are used to provide a correct or operative position in a particular plane. Thus, two pairs of light beams allow orientation of the positioning means in at least two of the X, Y and Z planes. The two pairs of light beams also allow the positioning means to be oriented both horizontally in the X and Y directions and vertically in the Z direction.

In one example, four light beams could be generated. In a further example, 6, 8, or even more, light beams could be generated as required. If the light beams are arranged in pairs, processing means could be used to switch between the different light beam pairs. Different light beam pairs could be set at different angles or heights in the positioning means relative to each other to allow different pre-determined operative distances to be provided.

Thus, the pre-determined angle and/or distance of the lighting means providing the at least first and second visible light beams typically corresponds to the pre-determined or operative distance of separation of the positioning means or lighting means from the object, surface of part, thereby allowing the positioning means to accurately and reproducibly position apparatus associated with the positioning means relative to a required surface in use.

Preferably the light beams within each light pair are projected substantially 90 degrees relative to a further light pair in the positioning means.

The method of moving the positioning means to create the overlap of the projected light beams in use is quick and easy, thereby reducing the skill level required by users to use the positioning means and apparatus associated therewith and reducing the costs associated with incorrect positioning of apparatus, objects, parts and/or surfaces. In addition, it provides an improved weld quality.

Preferably the positioning means includes a housing or frame which can be integrally formed with, attached or detachably attached to apparatus, an object, part, surface and/or the like which needs to be correctly positioned relative to a further object, part and/or surface.

For example, if the positioning means is to be attached to a robotic weld torch, the dimensions of the housing or frame can be substantially the same as a conventional shroud for the robotic weld torch, thereby allowing the housing or frame to be retrofitted to a conventional robotic weld torch.

The attachment means for attaching or detachably attaching the positioning means can include a screw fitting, bayonet fitting, friction fit, one or more screws, bolts, ties, clips, inter-engaging members and/or the like.

If the positioning means is integrally formed and is to be used on a weld torch, the positioning means typically needs to be heat resistance and may need to be formed such that weld wire can pass through the positioning means.

In one embodiment the positioning means is for use on a weld torch, such as a robotic weld torch, and the housing or frame is integral with, attached or detachably attached to a free end of the weld torch adjacent the electrode wire. The housing or frame can have a first end with attachment means for attachment adjacent the free end of the weld torch, and a second end adjacent the electrode wire in or from which the light beams are projected.

Preferably a power source is provided to power the lighting means. The power source can be provided in or on the housing or frame of the positioning means. In one embodiment the power source can be remote from the housing or frame and/or can be powered via a power source of the apparatus or weld torch on which the positioning means is to be used.

In a preferred embodiment the power source is in the form of at least one battery and preferably at least one rechargeable battery. A docking station can be associated with the housing or frame to allow docking of the positioning means and/or a part thereof with the docking station to allow recharging of the power source.

The docking station cab can allow recharging via electrical contacts provided on the docking station which are brought into engagement with complementary electrical contacts provided on the housing or frame of the positioning means. In a preferred embodiment, the docking station can allow recharging via induction with, for example, an induction coil provided on the docking station into which the housing or frame of the positioning means, which also has at least one induction coil provided therein, is located. The use of recharging by induction is preferable since it allows the housing or frame to be made as a substantially sealed unit, more robust and reduce the risk of damage, contamination, ingress of water or dirt and/or the like therein.

Preferably the lighting means is in the form of a plurality of light sources, such as laser beams, fibre optics, LEDs and/or the like. Each light source is typically provided a spaced distance apart from an adjacent light source in or on the housing, thereby allowing a pre-determined distance or angle of light beams projected from the light sources to be set. The light source can be located on, located in, recessed in the housing or frame or in any other manner providing two or more light beams are emitted from or adjacent an end or a part of the housing or frame.

In one embodiment adjustment means can be provided to allow adjustment of the angle and/or distance of the lighting means or light source. This adjustment can allow the position, distance or angle of the lighting means relative to the housing of the positioning means, relative to an adjacent light source and/or a workpiece and/or the like to be changed, thereby allowing adjustment of the pre-determined or operative distance at which the light beams will intersect or overlap. The adjustment means can allow adjustment to a user selected arbitrary position or allows adjustment between two or more pre-determined positions.

For example, when the positioning means is used on apparatus, such as a robotic weld torch, the adjustment means could include a pin or protruding arm on one of the housing and/or apparatus which is movable in a curved or arced slot on the other of the housing or apparatus in use. In a further example, a plurality of removable spacing elements can be used to change the separation distance of the positioning means relative to the apparatus. In a yet further example, a collet or movable jaw type of arrangement can be used. The movable jaw could include a plurality of jaw members located adjacent the second end of the housing or frame of the positioning means which are movable between open and closed positions. Lighting means could be provided in the jaw members, such that movement of the jaw members adjusts the distance of the lighting means from the free end of the weld torch.

In a preferred embodiment, the adjustment means allows the position of the housing or frame of the positioning means, and thus the position of the lighting means, to be changed relative to the free end of a robotic weld torch. Thus, the adjustment means allows the distance of the torch from the workpiece, at the point where light beams will overlap or intersect, to be changed.

The adjustment means can be actuated manually, be semi-automated or fully automated as required. Processing means could be associated with the lighting means to allow the lighting means to switch between different settings, positions and/or the switch between different light beam pairs.

The visible light beams can be any or any combination of colours. For example, the light beams could be the same colour or different colours could be used, such that when the light beams overlap, they form a further colour. In one example, different coloured light beams could be used to indicate positioning of the light beams associated with a different axis or plane, such as a X, Y and/or Z axis.

In one embodiment a further illumination source is provided to aid visibility in the locality of use of the positioning means. The further illumination source is typically a different colour to the lighting means of the positioning means, thereby allowing an operator to more easily visualise the light beams. The further illumination source is preferably a diverging source of light and is preferably located to project outwardly from the second free end of the positioning means or weld torch.

Means could be provided to allow adjustment of the size, shape, focus and/or the like of a light beam. In one embodiment lenses with different magnifications can be associated with the light beams to allow adjustment of the size, shape and/or focus of the light beam.

Different sized and/or shaped positioning means could be used with different sized and/or shaped apparatus and/or robotic weld torches. Alternatively, adaptor means could be provided to allow a positioning means to be used with a number of different sized and/or shaped apparatus and/or robotic welding torches. The adaptor means could include an intermediate attachment member having a first end of suitable dimensions to fit the apparatus or weld torch and a second end of suitable dimensions to fit the positioning means thereto.

Sensing means could be associated with the positioning means and/or object, part or surface to signal when intersection or overlapping of the light beams takes place or has not taken place. The sensing means could include any suitable visual, audio and/or kinaesthetic means. The sensing means could be used to inform an operator or could be used with processing means to provide auto-correction of the positioning means.

In one embodiment a feedback system is provided, such that on detection that the light beams are not intersected, processing means automatically instructs the apparatus associated with the positioning means to move until intersection of the light beams is achieved.

Preferably control means are provided to allow control of the power source and/or lighting means associated with the positioning means. The control means can move the power source and/or lighting means between on and/or off conditions and/or can move the lighting means between a continuous lit position and/or one or more flashing light positions. The control means can be actuated manually or automatically. In one example, the control means is in the form of a switch which can be actuated by an operator. In a further example, the control means includes one or more electrical contacts which, when brought into contact with one or more other electrical contacts, automatically switches the lighting means and/or power source to an on condition. Thus, in one example, when the housing of the positioning means is fitted onto the end of a robotic weld torch, the lighting means is automatically switched from an "off" condition to an "on" condition.

Preferably alarm means can be provided to signal to an operator if the weld torch or apparatus is used or attempted to be used whilst the positioning means is still attached thereto. This could prevent damage to the positioning means and/or apparatus if the operator forgot to remove the positioning means from the apparatus prior to use of the apparatus. In an alternative embodiment the positioning means is designed to remain on the apparatus or weld torch during normal use.

According to a second aspect of the present invention there is provided a method of using positioning means for positioning a first object, surface or part relative to at least a second object, surface or part in use, wherein the method includes the steps of moving the positioning means relative to an object, part or worksurface in use until at least first and second visible light beams generated by lighting means associated with the positioning means and projected onto said object, part or worksurface intersect and/or substantially overlap at an operative point on said object, part and/or worksurface.

According to further independent aspects of the present invention there is provided positioning means for a robotic weld torch; and a robotic weld torch with positioning means.

In one embodiment the positioning means is used in combination with one or more light sensing means to detect the position of the lighting means associated with the positioning means and thus the positioning means. As such, the positioning means can be used as part of a positioning system. Preferably the light sensing means are provided in different positions in the X, Y and/or Z plane and as the light beam passes over a sensor, the sensor is actuated.

According to a yet further aspect of the present invention there is provided a positioning system, said positioning system including positioning means and a platform which the positioning means is required to be positioned relative to, the positioning means including lighting means capable of generating at least first and second light beams or light projections in use, the lighting means being arranged such that the light beams or light projections are directed away from the positioning means in a converging direction and said light beams or light projections intersect or substantially overlap with each other at a pre-determined distance from said positioning means, the system further including light sensing means on or associated with the platform to allow detection of the intersected or substantially overlapping light beams or projections in use.

Preferably the light sensing means include one or more sensors. Further preferably the light sensing means are located in such a way that they only detect the light beams or projections when overlapped or intersected rather than single light beams. For example, the one or more sensors can be recessed a pre-determined distance below an upper surface of the platform or a housing located on the platform.

Preferably one or more side walls defining the inlet to the recessed sensor are angled or have a narrowing taper from the free end towards the sensor, thereby allowing a single dot or overlapping beams to be focused onto the sensor.

Further preferably a plurality of light sensing means are provided and typically each sensing means is provided in each corner or required part of the platform.

According to a yet further aspect of the present invention there is provided a training aid for training an operator to use the positioning means and/or apparatus associated with the positioning means.

When the present invention is used on a robotic weld torch, it has the advantages of providing improved weld quality and consistency, faster programming of the robotic torch by an operator, improved visibility of the weld area to an operator and can act as a training aid for an operator.

In one embodiment, the positioning means of the present invention can be used to correctly position location pins used in the weld process. The weld parts to be welded are typically provided with apertures thereon which are located over location pins provided on a weld platform or surface in use to allow correct alignment of the weld parts relative to the weld platform or surface. However, if the location pins are in an incorrect position, the weld path followed by the robotic weld torch is likely to be incorrect. The present invention can be used by an operator to visually check the position of the location pins as the operator would be required to align/overlap the light beams, and preferably two pairs of light beams, on the centre of the location pin to ensure its correct position.

In a further embodiment, the positioning means of the present invention is used to correctly position the weld platform on which the weld pin and/or weld parts are to be located in use. Positioning of the weld platform typically requires use of the light sensing means as described above.

In a yet further embodiment, the positioning means of the present invention can allow an operator to check that the weld wire or "cast" is straight and is not bent. The operator can do this by seeing if the light beams projected onto the electrode wire substantially surround the electrode wire (i.e. the electrode wire is substantially centrally located in the overlapped beams). If the wire is straight, the overlapping beams will substantially equally surround the longitudinal length of wire (i.e. appear coaxial with the same). If the wire is bent, the longitudinal length of the wire will be offset from the overlapping centre of the beams (i.e. will not appear coaxial with the same).

Embodiments of the present invention will now be described with reference to the accompanying figures, wherein:

FIG. 2a illustrates positioning means of the present invention in one embodiment when connected to a conventional weld torch of the type shown in FIG. 1;

FIG. 2b illustrates different positions of the light beams emitted from the positioning means in FIG. 2a;

FIG. 3 shows an end view of the positioning means in FIG. 2a;

Figure 1:
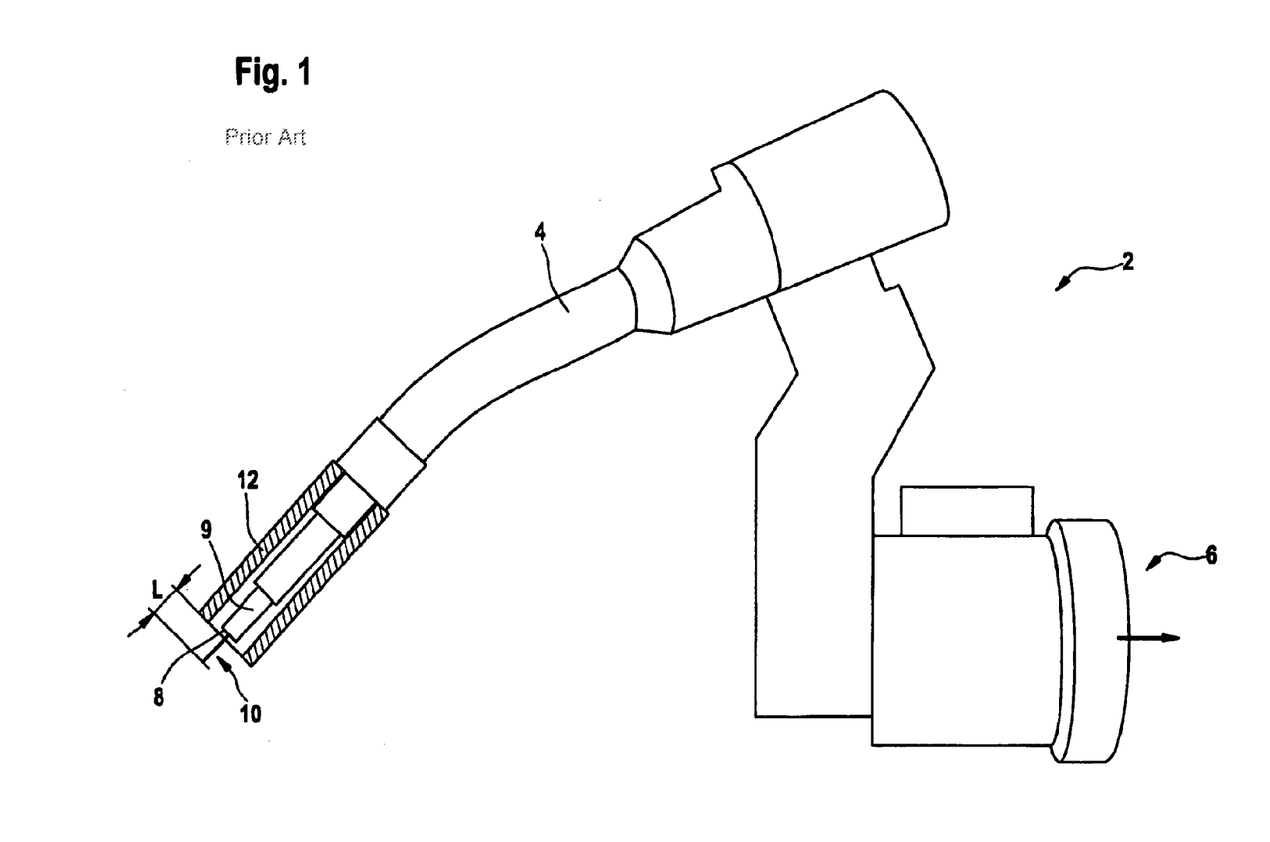
FIG. 1 illustrates an example of a conventional robotic weld torch forming part of the prior art.

Referring firstly to FIG. 1, there is illustrated a prior art robotic weld torch 2 for welding two or more weld parts together. Torch 2 includes an arm member 4 having a first end 6 for attachment to a robotic unit and a second free end 8 at which a nozzle 9 is located.

An electrode wire 10 located in a channel in arm member 4 protrudes outwardly a pre-determined distance 'L' from free end 8. A removable shroud 12 is fitted onto arm member 4 adjacent second end 8 to allow gas, which is used to shield the welding process, to be directed onto the area surrounding the weld.

Conventionally, positioning of the torch 2 relative to the work piece to be welded is undertaken by an operator. However, this alignment/positioning process is subject to human error which affects the quality and consistency of the weld.

In order to overcome this problem, positioning means 13 are provided which fit onto the second end 8 of torch 2 in place of shroud 12 to allow correct positioning of the torch end 8 from workpiece 14, as shown in FIGS. 2-4b. More particularly, positioning means 13 is in the form of a shroud 16 which can fit onto arm member 4 in a similar manner to conventional shroud 12. A first end of the shroud 16 can be provided with adaptor means for engagement with the end 8 of the welding torch 2. Shroud 16 has a channel 20 running therethrough to allow the free end 8 and the nozzle 9 of arm member 4 to be located therein and to allow the weld wire to pass therethrough from the second free end of the arm member in order to check whether the wire is bent or straight. In accordance with the present invention, shroud 16 has lighting means in the form of at least two laser diode light sources 22, 24 located at or adjacent the free end 26 thereof. The laser light sources 22, 24 generate two light beams 28, 30 therefrom respectively. Further embodiments can contain more than two light beams and preferably multiples of two light beams to form multiple light beam pairs as will be described in more detail below. The laser diode light sources 22, 24 can be located in recesses at or adjacent the free end 26 of the shroud 16.

Figures 2A, 2B:
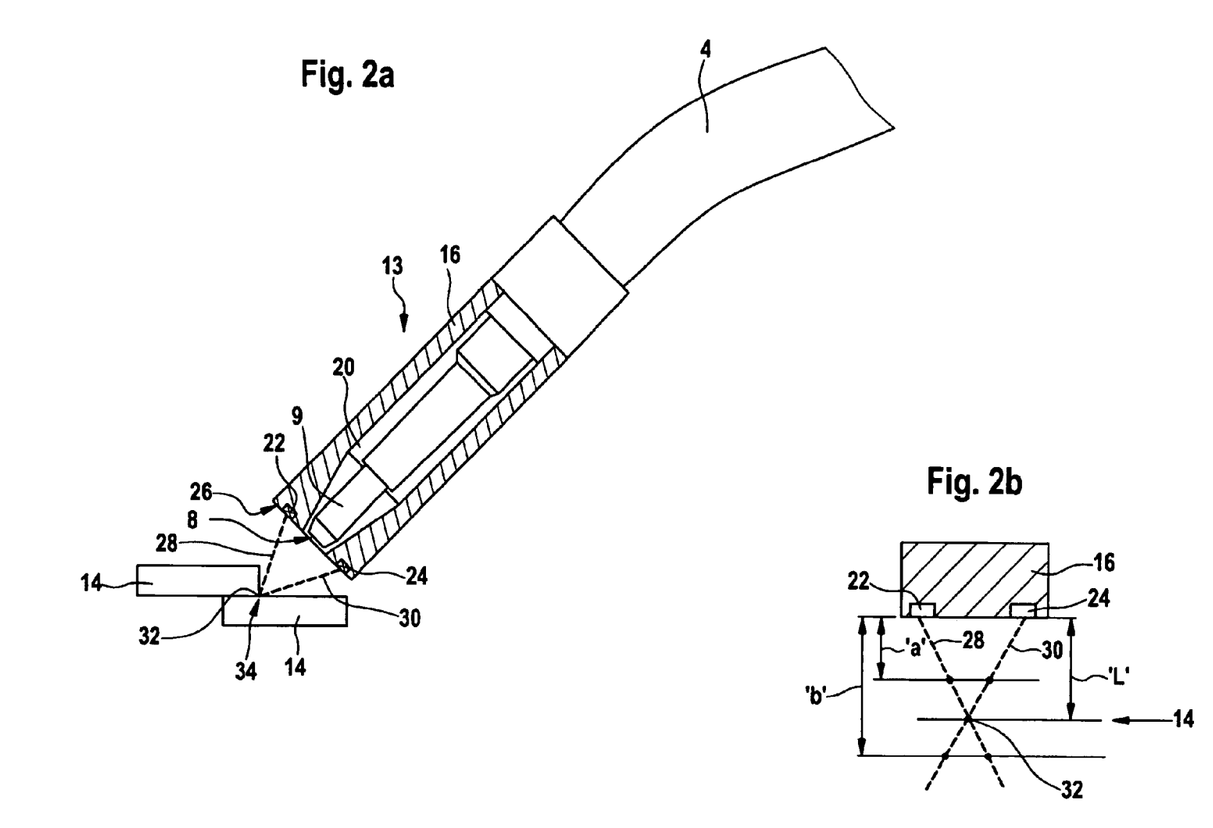
Figure 3:
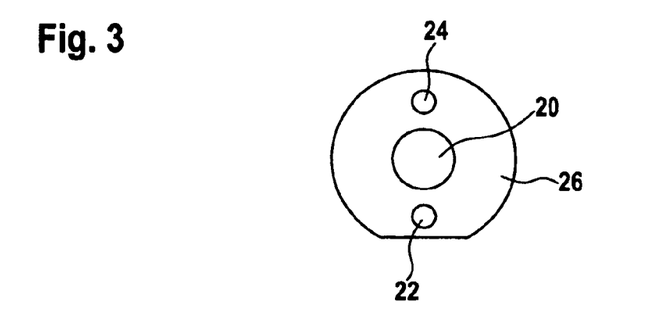
Figure 4A:
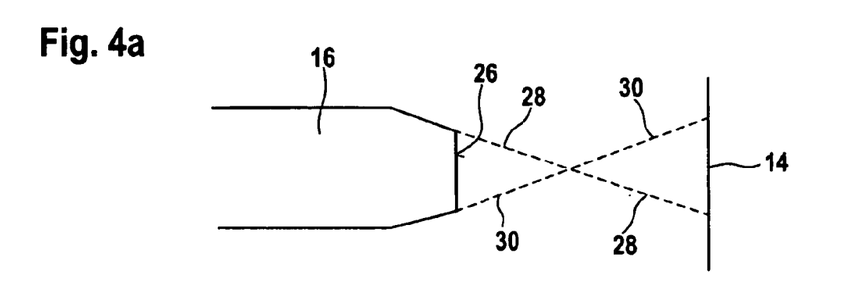
FIGS. 4a and 4b illustrate incorrect alignment and correct alignment of the positioning means relative to a workpiece respectively.
Figure 4B:
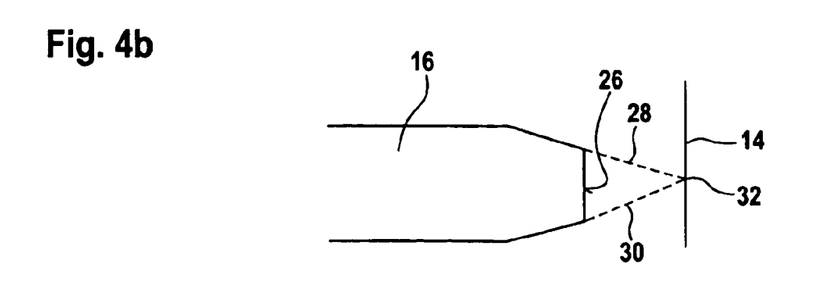

The distance between the light sources 22, 24 and the angle of the light sources relative to each other is pre-determined, such that at a pre-determined height 'L' of the light sources 22, 24 above workpiece 14, the light beams 28, 30 emitted from light sources 22, 24 will substantially overlap to form a single light dot 32, as shown in FIGS. 2b and 4b. This single light dot needs to be in precise alignment with the weld seam 34 between workpiece 14 and workpiece 14' to which it is to be welded. When a single light dot is formed by the two overlapping beams, the operator will know that correct positioning of the weld torch relative to the weld workpiece has been achieved. If the light sources 22, 24 are too close to workpiece 14 (i.e. at a distance 'a'), the light sources 22, 24 will not have converged onto each other and will be projected onto the workpiece a spaced distance apart, as shown in FIG. 2b. If the light sources 22, 24 are too far apart from workpiece 14 (i.e. at a distance 'b'), the light sources will intersect each other at a spaced distance in front of work piece 14, as shown in FIGS. 2b and 4a, and will be projected on the workpiece 14 a spaced distance apart.

Thus, when the light beams are a spaced distance apart on the workpiece the operator knows the weld torch is not positioned correctly with respect to the workpiece and can increase or decrease the height of free end 8 of the weld torch from the workpiece until a correct height or overlap is achieved. The operator knows when a correct height between the weld torch and workpiece is achieved once the two light beams overlap to form a single light dot.

There may be a number of different predetermined heights the weld torch needs to be above the workpiece for a precise weld to take place, depending on the type of workpiece being welded. The distance of the free end of the weld torch from the weld seam can be adjusted manually, semi-automatically or automatically via an operator and/or using processing means.

Figure 7:
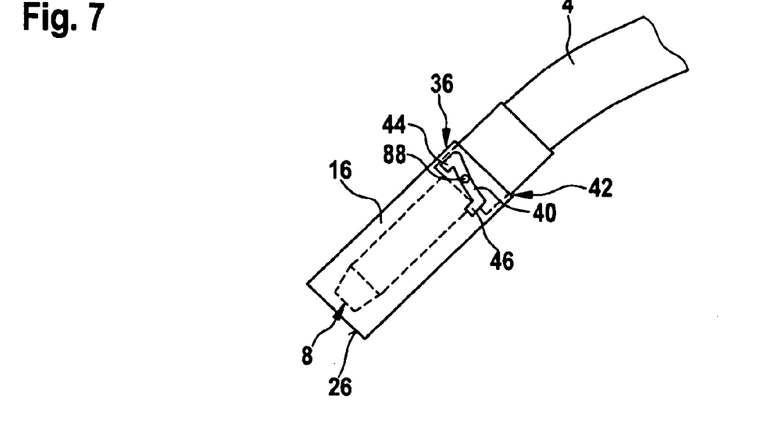
FIG. 7 illustrates adjustment means for use with positioning means of the present invention in one embodiment.

In one example, as shown in FIG. 7, manual adjustment means 36 can be provided on shroud 16. Adjustment means 36 can include a pin 38 provided on arm member 4 which is slidably mounted in a curved slot 40 defined in shroud 16 adjacent attachment end 42 thereof. Recesses 44, 46 are provided at each end of slot 40 and protrude towards the free end 26 of the shroud 16. The pin 38 can be slidingly moved in slot 40 and located in either of recesses 44, 46. The position of recesses 44, 46 each corresponds to the free end 8 of the weld torch being a pre-determined different height from a workpiece at which beams 28, 30 will overlap to form a single light dot. In order to move the pin 38 out of a recess 44, 46, the operator pushes shroud 16 towards arm member 4, thereby moving pin 38 into curved slot 40, and rotates the shroud to move the pin in the curved slot.

In another example, the adjustment means includes one or more removable spacing elements for location between the first end of the shroud 16 and the end 8 of the welding torch 2.

A further illumination source in the form of an LED can also be positioned adjacent end 26 of shroud 16 to provide illumination in the weld area, thereby increasing the visibility of the weld area to an operator. The LED is typically a different colour to the two light beams and provides general illumination rather than a focused light beam to prevent an operator from confusing the general illumination source from the specific positioning aid light beams.

Figure 5:
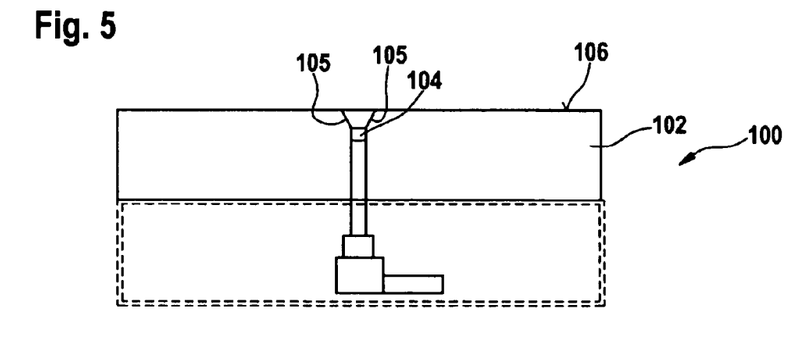
FIG. 5 illustrates a cross section of a positioning platform for use with positioning means of the present invention according to one embodiment.
Figure 6A:
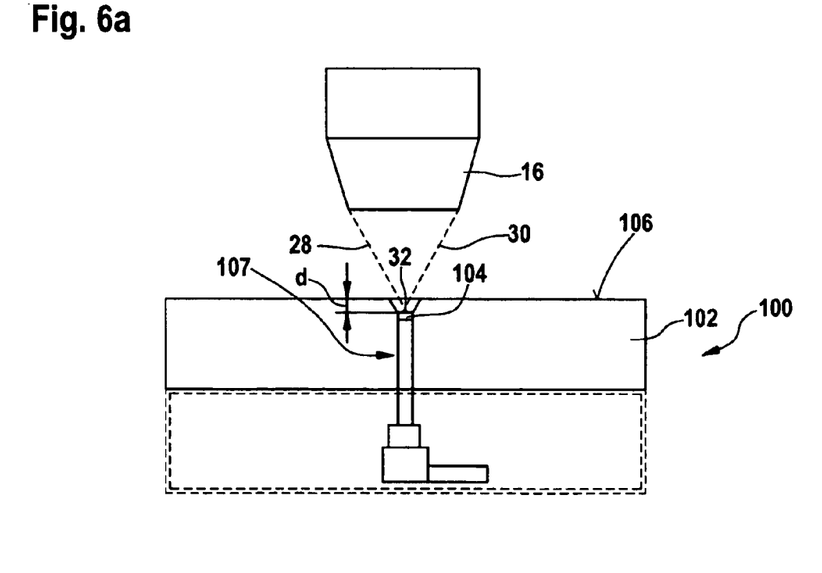
FIG. 6a illustrates a cross section of the positioning means of the present invention in use on the positioning platform in FIG. 5.
Figure 6B:
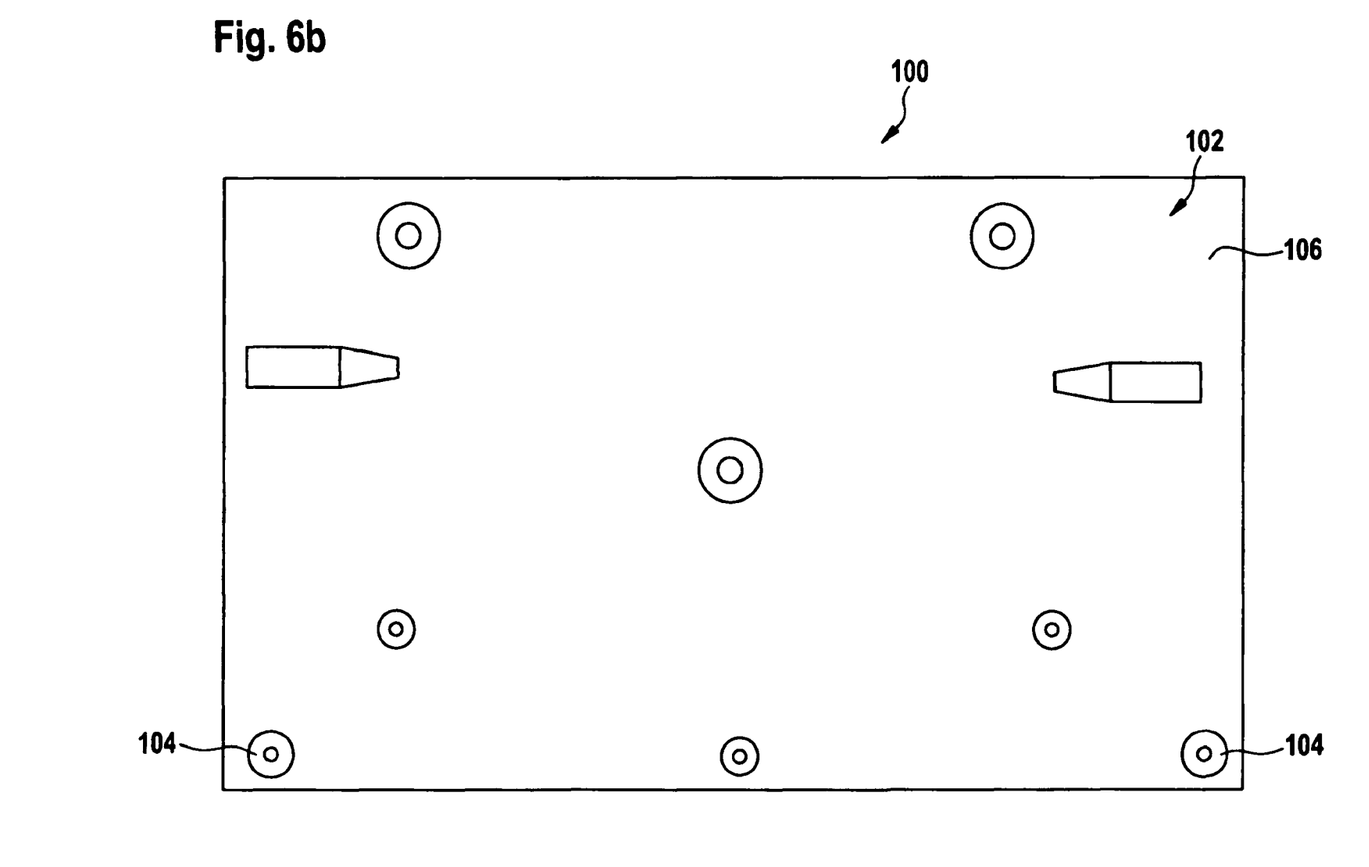
FIG. 6b illustrates a plan view of a positioning platform for which positioning means can be used.

Referring to FIGS. 5-6b, there is shown a positioning system in which positioning means similar to that described above could be used. In the above described examples, the correct position of the torch relative to a workpiece or weld seam is achieved by moving the torch in a particular plane or axis. However, it is often the case that the entire platform on which the weld is to take place needs to be correctly aligned relative to the robotic arm for precision welding and thus the robotic torch needs to be aligned in more than 1 axis, such as the X, Y and/or Z axis. This is particularly the case for bent weld torches where the angle of the torch relative to the workpiece is important. Thus, in accordance with a further aspect of the present invention, a positioning system 100 is provided. The positioning system 100 includes a platform 102 in which a number of light sensors 104 are located at pre-determined positions on or adjacent an upper surface 106 of said platform, typically in the X, Y and Z planes. When setting up the positioning of the weld torch relative to weld platform 102, the torch is moved across the platform to follow a desired weld path. When the overlapped light beams stop over a light sensor 104, a signal is initiated from said sensor and is transmitted to processing means associated with the robotic arm to inform the operator that correct alignment has taken place.

In order to ensure that sensor 104 is only activated when the light beams are overlapping, as shown in FIG. 6a, the sensor is recessed a pre-determined distance 'd' below upper surface 106. In addition, the side walls 105 of the platform defining the entry to the recess or channel 107 have a narrowing taper towards sensor 104. This ensure the sensor is activated when the robotic torch is stationary and directly overhead (substantially vertically above sensor 104), as shown in FIG. 6a.

Figure 8A:
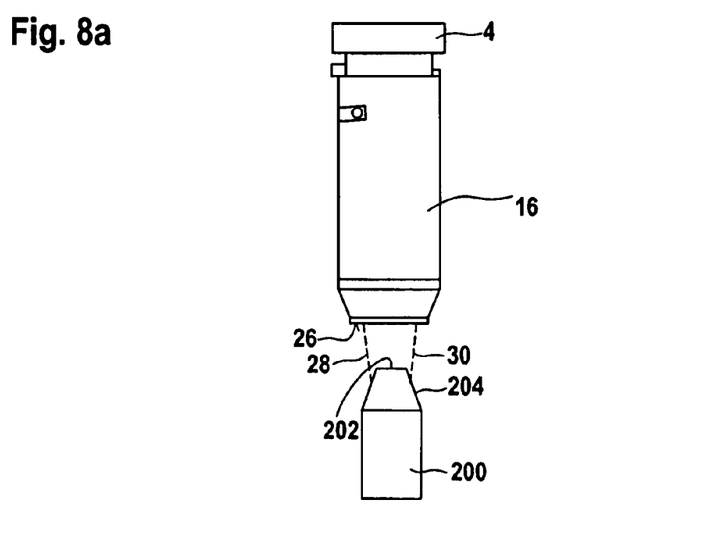
FIG. 8a illustrates use of the positioning means for aligning location pins used on a positioning platform.

In use, the weld parts that are to be welded are located on the platform using location pins 200, one of which is shown in FIG. 8a. The location pins are typically located at pre-determined positions on the platform and apertures defined in the weld parts are located over said location pins in use. The positioning means of the present invention can be used to ensure the location pins are in the correct location and the robotic arm is correctly aligned with the same.

The robotic arm is typically pre-programmed with where the location pins should be on the platform when in a correct weld position. The pre-programme typically forms a master plan programme. The robotic arm can then be actuated to move to the pre-programmed position of the locations pins. If the location pins have been moved out of alignment from their correct position, when the robotic arm passes over the point where the location pins should be, the light beams generated by the positioning means will not overlap in the centre of the location pin as they should do if the location pins are in the correct position.

Figure 8B:
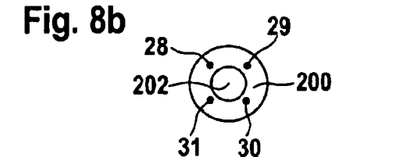
FIGS. 8b and 8c show an example of correct positioning of the positioning means with a location pin and incorrect positioning of the positioning means with a location pin respectively.
Figure 8C:
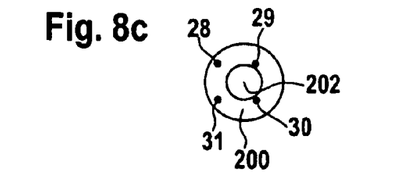

For the embodiment shown in FIGS. 8a-8c, two sets of laser beam pairs 28, 30 and 29, 31 respectively need to be provided. The laser beam pairs are typically located at substantially 90 degrees to each other. FIGS. 8b and 8c show a top view of a location pin 200 with an upper free end 202 having a narrowing taper 204 towards said free end. If the location pin is correctly positioned, when the shroud 16 of the positioning means located on the free end of the robotic arm is directly above the master plan location pin position, the laser beams 28, 30, 29, 31 will be projected substantially equally around the centre 202 of the location pin 200, as shown in FIG. 8b. If the location pin is incorrectly positioned, laser beams 28, 30, 29, 31 will be projected in an offset manner from the centre 202 of the location pin 200, as shown in FIG. 8c. An operator can visually see the light beams projected onto the location pin and can immediately determine whether the location pins have been moved from their correct location based on the light beam projection on the location pin.

Thus, in the above described embodiment a cross hair arrangement of beams could be provided to align the location pins. The cross hair arrangement could include four spaced apart linear lines spaced at approximately 90 degrees to each other with a central space between the inner most ends of said cross hair arrangement.

In the embodiment of FIGS. 8a-8c, the two pairs of laser beams (28,30; 29,31) allow the positioning means (13) to be oriented both horizontally in the X and Y directions and vertically in the Z direction. By visually observing the projections of the laser beams (28,30; 29,31) relative to the centre (202) of the location pin (200), the operator can determine whether the positioning device is correctly oriented in the X and Y directions. Further, by observing the height of the projections of the laser beams (28,30; 29,31) on the tapered portion (204) of the location pin (200), the operator can determine whether the positioning device (13) is oriented at the correct height in the Z direction.

Figure 10A:
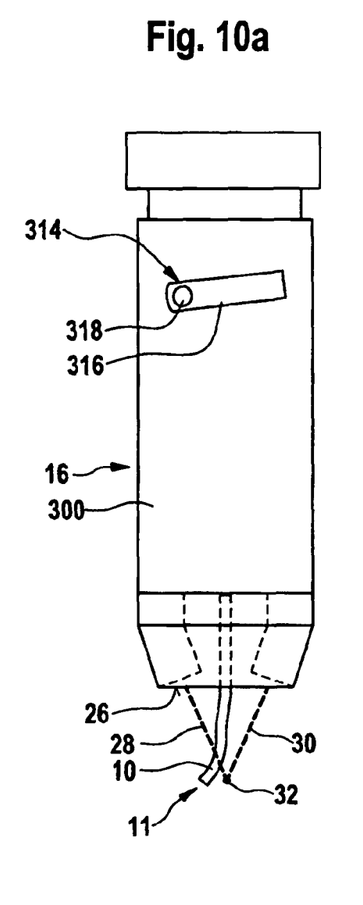
FIGS. 10a and 10b illustrate a yet further embodiment of the present invention in which an operator can check whether the weld wire is bent and straight respectively.
Figure 10B:
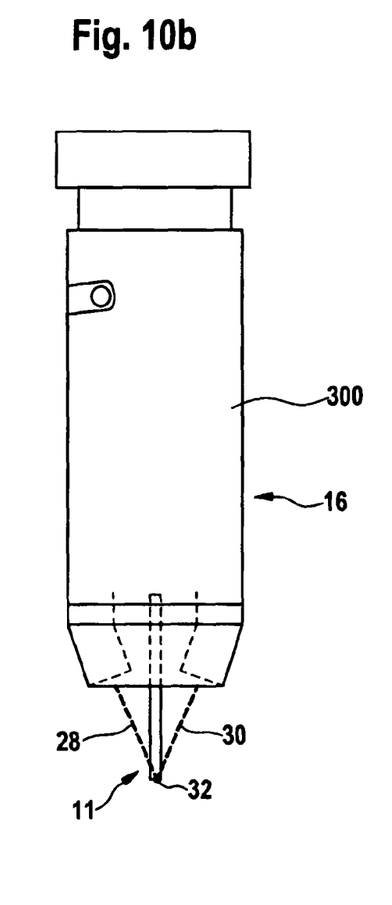

A further problem which can result in misalignment of the weld parts for welding is when the weld wire 10 of the robotic arm is bent. The free end of weld wire 10 can often become bent during the set up procedure. If the weld path of a robotic weld torch is programmed for a bent wire, when the weld wire is fed from a wire feeder into the robotic arm in a straight manner, typically due to rollers being provided, the weld path will be wrong. As such, the positioning means of the present invention can be used to check whether the weld wire is bent or straight. In FIG. 10a, wire 10 is bent and the four converging light beams (only two of which are shown for clarity) 28, 30 do not overlap at point 32 on the centre of the wire 10. An operator can visually determine that the overlapped light beams 32 are not projected onto wire 10 and the operator therefore knows the wire is bent and needs to be trimmed. In FIG. 10b, wire 10 is straight and the converging light beams 28, 30 therefore overlap at point 32 on the wire 10, thereby informing the operator that the wire is straight. At least four light beams are typically required in this embodiment so that an operator can check the 'cast' of the wire in at least four different directions. With reference numeral 11 a mig weld wire is denoted which is fed through the welding torch. This can serve as a check using the light beams to ensure that the wire is being fed through the rollers and is being fed out straight.

It will be appreciated that any or any combination of functions of the positioning means and/or positioning system can be fully automated if required. A feedback system can be used whereby the position of the light beams on a surface can be detected and signalled to processing means controlling the movement of the robotic weld torch, thereby allowing the movement or distance of the weld torch relative to the surface to be adjusted accordingly.

With reference to FIGS. 9a-10b, there is illustrated a further adjustment mechanism for adjusting the position of the light sources of the positioning device relative to a weld part. In this embodiment, the shroud 16 includes an outer sleeve 300 which is movably mounted on an inner sleeve 302. The inner sleeve 302 has a channel 304 defined therethrough to allow the weld wire to pass through the channel to allow the 'cast' of the wire to be determined as described above in relation to FIGS. 10a and 10b.

Figure 9A:
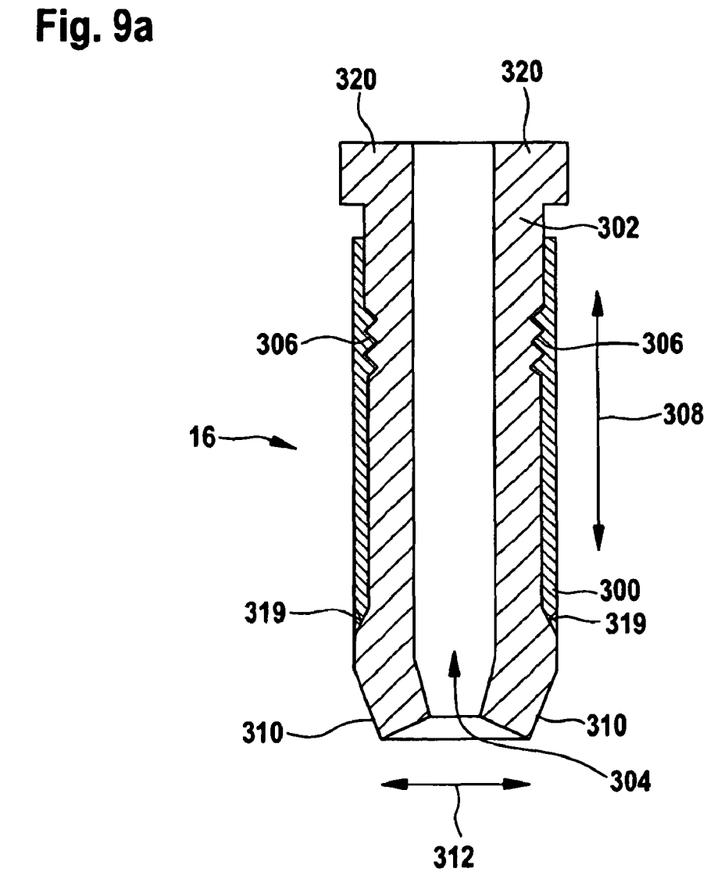
FIGS. 9a and 9b illustrate a cross sectional view and end view respectively of a further embodiment of positioning means according to the present invention.

In the illustrated embodiment, outer sleeve 300 is rotatably mounted on inner sleeve 302 via complementary screw threads 306 to allow movement of the outer sleeve relative to the inner sleeve substantially longitudinally of the shroud 16, as shown by arrow 308 in FIG. 9a. Other movement mechanisms could be used, such as a sliding mechanism, pivot mechanism and/or the like.

Figure 9B:
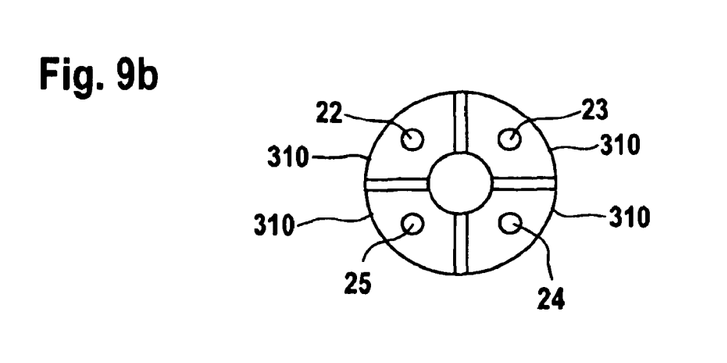

The free end of inner sleeve 302 is provided with a plurality of movable jaw members 310 which are capable of moving in an inwardly and/or outwardly direction substantially transverse to the longitudinal axis of the shroud, as shown by arrow 312. The light sources are provided in the jaw members 310 adjacent the free ends thereof. Two pairs of laser diode light sources 22, 24 and 23, 25 are mounted at the ends of the jaw members 310.

As outer sleeve 300 is rotated towards jaw members 310, this causes jaw members 310 to move inwardly of each other, thereby moving the light sources inwardly of each other. This changes the height and angle of the light sources, thereby allowing adjustment of the operative point at which the light beams generated from the light sources will overlap. As outer sleeve 300 is rotated away from jaw members 310, this causes the jaw members 310 to move outwardly of each other, thereby moving the light sources outwardly of each other. Limiting means 314 can be provided to limit movement of the outer sleeve in the longitudinal direction 308. The limiting means in the illustration includes a slot 316 in which a pin 318 is slidably located. Rotation of the outer sleeve 300 relative to inner sleeve 302 causes pin 318 to move in slot 316, the movement of the pin being limited by the ends of slot 316. Complementary tapered surfaces 319 can be provided on the outer sleeve 300 and the inner sleeve 302 to move the jaw members 310 inwardly or outwardly as the outer sleeve 300 is rotated relative to the inner sleeve 302.

The jaw members can be moved via resilient biasing means, via a pivot type mechanism and/or the like.

The inner sleeve 302 can be have electrical contacts or induction means provided at end 320 of shroud 16, as shown in FIG. 9a, thereby allowing the shroud to be placed in a recharging unit to recharge a power source associated with shroud 16 in use.

In addition, it will be appreciated that the present invention could be used as a training aid to train welding operators to use the welding equipment in a precise manner and to improve the weld quality. The positioning means and/or positioning system could signal the position and movement of the light beams to processing means which could record the same, thereby providing a record of the programming movement. This can be used by a trainer to help train the welding operators. This training could be undertaken using a hand held weld torch or a robotic weld torch as required. An electronic test plate with sensors could be used to detect the light beams from the positioning means being directed onto the sensors. Activation of the sensors can be stored in memory and processing means can be used to generate a graphical representation or other suitable data feedback for the operator to allow them to see the accuracy of their weld, weld path, programming and/or the like.

The positioning shroud is typically formed from a heat resistance material, such as a metal, metal alloy, durable high temperature plastic and/or the like.

It will be appreciated by persons skilled in the art that any or any combination of the abovementioned features can be used on positioning means and/or in a positioning system according to the present invention.

The invention claimed is:

1. A welding torch shroud capable of producing a light signal to position a welding torch relative to a workpiece, the shroud comprising:
   a frame having first and second opposite ends and defining a channel extending between the first and second ends, the channel adapted to receive a welding nozzle, the first end of the frame being attachable to an end of the welding torch; and
   a lighting means for producing at least two pairs of light beams projecting away from the second end of the frame, the lighting means comprises at least two pairs of light sources arranged for directing the at least two pairs of light beams therefrom in converging directions so that the at least two pairs of light beams intersect with each other and provide a light signal at a predetermined distance from the second end of the frame, the at least two pairs of intersecting light beams intersecting at substantially the same point and wherein the at least two pairs of light sources are mounted radially outward of the channel and adjacent the second end of the frame.

2. The welding torch shroud according to claim 1, characterized in that the shroud includes means for adjusting the angle or distance of the at least two pairs of light sources to adjust the point of intersection of the at least two pairs of light beams.

3. The welding torch shroud according to claim 1, characterized in that the at least two pairs of lighting sources are at least two pairs of laser diode light sources.

4. The welding torch shroud according to claim 1, characterized in that adjustment means are provided for adjusting the longitudinal position of the frame and/or the at least two pairs of light sources mounted on the frame relative to the end of the welding torch to adjust the distance of the intersection point of the at least two pairs of light beams from the end of the welding torch.

5. The welding torch shroud according to claim 4, characterized in that limiting means are provided to limit the longitudinal movement of the frame and/or the at least two pairs of light sources mounted on the frame relative to the welding torch.

6. The welding torch shroud according to claim 4, characterized in that the adjustment means includes one or more removable spacing elements for location between the first end of the frame and the welding torch.

7. The welding torch shroud according to claim 1, characterized in that attachment means are provided for attaching or detachably attaching the frame to the welding torch.

8. The welding torch shroud according to claim 7, characterized in that the attachment means comprises a screw fitting, bayonet fitting, friction fit, one or more screws, bolts, ties, clips, inter-engaging members or the like.

9. The welding torch shroud according to claim 1, characterized in that the frame is rotatably mounted on the end of the welding torch.

10. The welding torch shroud according to claim 1, characterized in that the at least two pairs of light sources are provided in recesses defined in the second end of the frame.

11. The welding torch shroud according to claim 1, characterized in that lens or magnification means are associated with the at least two pairs of light sources to adjust the size and/or angle of convergence of the at least two pairs of light beams produced from the at least two pairs of light sources.

12. The welding torch shroud according to claim 1, characterized in that each of the at least two pairs of light beams is projected substantially 90 degrees relative to the further light beam pair.

13. The welding torch shroud according to claim 1, characterized in that the frame has a power source in the form of at least one rechargeable battery, the frame includes electrical contact means to allow engagement with complementary electrical contact means provided on a docking station for allowing recharging of said battery.

14. The welding torch shroud according to claim 1, characterized in that each pair of the at least two pairs of light beams is a different color so that when the at least two pairs of light beams overlap, a light signal of a further different color is produced.

15. The welding torch shroud according to claim 1, characterized in that adaptor means are provided for engagement between the first end of the frame and the end of the welding torch.

16. A welding torch shroud capable of producing a light signal to position a welding torch relative to a workpiece, comprising:
a frame having first and second opposite ends and defining a channel extending between the first and second ends, the channel adapted to receive a welding nozzle, the first end of the frame being attachable to an end of the welding torch; and
a lighting means for producing at least two pairs of light beams projecting away from the second end of the frame, the lighting means comprises at least two pairs of light sources mounted radially outward of the channel and adjacent the second end of the frame arranged for directing the at least two pairs of light beams therefrom in converging directions so that the at least two pairs of light beams intersect with each other and provide a light signal at a predetermined distance from the second end of the frame, the at least two pairs of intersecting light beams intersecting at substantially the same point and wherein adjustment means are provided for adjusting the longitudinal position of the frame and/or the at least two pairs of light sources mounted on the frame relative to the second end of the welding torch to adjust the distance of the intersection point of the at least two pairs of light beams from the second end of the welding torch.

17. The welding torch shroud according to claim 16, characterized in that the frame is rotatably mounted on the end of the welding torch.

18. A welding torch shroud capable of producing a light signal to position a welding torch relative to a workpiece, comprising:
a frame having first and second opposite ends and defining a channel extending between the first and second ends, the channel adapted to receive a welding nozzle, the first end of the frame being attachable to an end of the welding torch; and
a lighting means for producing at least two pairs of light beams projecting away from the second end of the frame, the lighting means comprises at least two pairs of light sources mounted radially outward of the channel and adjacent the second end of the frame arranged for directing the at least two pairs of light beams therefrom in converging directions so that the at least two pairs of light beams intersect with each other and provide a light signal at a predetermined distance from the second end of the frame, the at least two pairs of intersecting light beams intersecting at substantially the same point and wherein the frame is rotatably mounted on the end of the welding torch.

19. The welding torch shroud according to claim 18, characterized in that adjustment means are provided for adjusting the longitudinal position of the frame and/or the at least two pairs of light sources mounted on the frame relative to the end of the welding torch to adjust the distance of the intersection point of the at least two pairs of light beams from the end of the welding torch.

20. A method of using a welding torch shroud capable of producing a light signal to position a welding torch relative to a workpiece, the shroud comprising:
a frame having first and second opposite ends and defining a channel extending between the first and second ends, the channel adapted to receive a welding nozzle, the first end of the frame being attachable to an end of the welding torch; and
a lighting means for producing at least two pairs of light beams projecting away from the second end of the frame, the lighting means comprising at least two pairs of light sources providing the at least two pairs of light beams;
characterized in that the method includes the steps of:
directing the at least two pairs of light beams in converging directions so that the at least two pairs of light beams intersect with each other and provide a light signal at a predetermined distance from the second end of the frame, wherein the at least two pairs of intersecting lighting beams intersect at substantially the same point and wherein the at least two pairs of light sources are mounted radially outward of the channel and adjacent the second end of the frame.

21. A method for positioning a welding torch relative to a platform and determining whether one or more location pins are correctly positioned on the platform, by using the shroud according to claim 1 and characterized by the steps of:

moving the welding torch to a pre-programmed position for the location pin;

projecting the at least two pairs of light beams from the shroud onto the location pin; and determining whether the at least two pairs of light beams are projected substantially equally around the centre of the location pin in a correct position or if the at least two pairs of light beams are projected in an offset manner from the centre of the location pin in an incorrect position.

22. The method according to claim 21, characterized in that the at least two pairs of light beams are located at substantially 90 degrees to each other.

* * * * *